Patented June 6, 1939

2,160,882

UNITED STATES PATENT OFFICE 2,160,882

PROCESS OF MAKING AZO DYES

Herbert A. Lubs, Wilmington, Del., assignor to E. I. du Pont de Nemours & Company, Wilmington, Del., a corporation of Delaware No Drawing. Application September 24, 1937, Serial No. 165,489

2 Claims. (Cl. 8—13)

This invention relates to an improved method of making azo dyes, and to the dyes produced by the new method.

After diazotization, an excess of nitrous acid is present in the diazo component of azo dyes, its presence acting deleteriously on the process, and affecting the product. This harmful effect is particularly noticeable when the couplings are made in acid medium to an amine, small amounts of the coupling component itself being diazotized and, upon reaction with other coupling component molecules, forming impurities in the dye. If coupling is being made with a naphthol, nitroso bodies may be formed. The dyes produced under those conditions are off shade, and dull. In order to avoid this difficulty it has been proposed to diazotize incompletely in order to avoid the excess of nitrous acid, but that proposal is unsatisfactory because the efficiency of the process is reduced. It has also been proposed to diazotize completely and to eliminate excess nitrous acid by the addition of urea, but that process is unsatisfactory because it is not completely successful, it slows up the process, more than an hour being frequently required for the urea to react, and decomposition of the diazo component occurs. No wholly satisfactory method of overcoming these difficulties is known to the prior art.

It is an object of this invention to remove excess nitrous acid from the diazo component of an azo dye before coupling. Another object of the invention is to produce azo dyes of improved tinctorial properties. Another object of the invention is to shorten the time required to remove nitrous acid from a dye bath. Another object of the invention is to prepare complete diazotized aromatic amines which contain no excess of nitrous acid.

The objects of the invention are accomplished, generally speaking, by diazotizing the primary arylamine, removing the excess nitrous acid by the addition of sulfamic acid, and coupling the diazo component with an azo dyestuff coupling component.

The following examples describe but do not limit the invention:

Example 1

7.5 pts. of 3-nitro-4-amino-toluene were suspended in 300 pts. of water and 4.5 pts. of 100% hydrochloric acid. The suspension was cooled to 50° F. by the addition of ice, and 3.6 pts. of sodium nitrite were added. Diazotization was complete in approximately 1 hr., the bath was tested with potassium iodide starch paper, which indicated the presence of the acid. 2 parts of sulfamic acid were added to the bath and a test showed no nitrous acid present. 4.5 parts of 100% hydrochloric acid and 6.75 pts. of sodium acetate were added to the bath, and the so prepared diazo solution was mixed at once to 7.6 pts. beta naphthol dissolved in 250 pts. water with 2.25 pts. sodium hydroxide and 2.65 pts. sodium carbonate. The precipitated dye was isolated by filtration, washed and dried. This pigment when ground into linseed oil is much brighter than one in which the excess nitrite was not eliminated. It is also brighter than a pigment made as above in which the excess nitrite was destroyed by stirring the diazo 1 hr. with urea.

Example 2

45 pts. 2-naphthylamine-1-sulfonic acid were dissolved in 300 pts. water with 1.5 pts. sodium hydroxide. After cooling to 32° F. 13.8 pts. sodium nitrite were added. This was followed immediately by the addition of 18.5 pts. of 100% hydrochloric acid. 1.5 pts. of sulfamic acid were added to eliminate the excess nitrous acid. This diazo was coupled to the following suspension:

30 pts. beta naphthol dissolved in 1090 pts. water with 9 pts. of sodium hydroxide. The beta naphthol was precipitated out by the addition of 15 pts. glacial acetic acid. Immediately after coupling 10 pts. of sodium hydroxide were added followed by 30 pts. barium chloride. The suspension was heated to 150° F., filtered, washed, and dried. This pigment when incorporated in linseed oil is much brighter than a control run in which no sulfamic acid was used.

Example 3

44.2 pts. of 2-chlor-5-amino-toluene-4-sulfonic acid were dissolved in 500 pts. water with the addition of 8.5 pts. sodium hydroxide. This solution was poured onto ice and 18 pts. of 100% hydrochloric acid. Diazotization was effected by the addition of 13.8 pts. sodium nitrite. The excess nitrous acid was destroyed with 2 pts. sulfamic acid. This diazo was coupled to a solution of 30 pts. beta naphthol dissolved in 500 pts. water and 14 pts. sodium hydroxide. After coupling the alkalinity was reduced by the addition of 1.9 pts. of 100% hydrochloric acid. 35 pts. barium chloride were added and the suspension boiled for 30 minutes. The pigment was filtered, washed, and dried. When incorporated in linseed oil it is brighter than a control run made without sulfamic acid.

Example 4

In a similar manner elimination of excess nitrite prior to coupling tetrazo-di-chlor-benzidine to phenyl-methyl-pyrazolone in strongly acid solution produces a superior pigment.

Example 5

In the trisazo dye aniline-di-sulphonic acid diazotized and coupled to 1:7-Cleves acid diazotized and coupled to alpha-naphthyl-amine diazotized and coupled to phenyl-J-acid, elimination of the excess nitrous acid with sulfamic acid prior to each coupling step produces a blue color of improved shade and yield over a control in which sulfamic acid is not used.

Example 6

Leather was dyed in the usual way with dye prepared by diazotizing benzidine, and coupling each mol thereof one one mol of H-acid and one mol of gamma acid. The dye on the leather was then treated with nitrous acid to diazotize the free amino groups. Excess nitrous acid which is very harmful to leather was removed by treatment with sulfamic acid and the color developed with m-toluylene diamine.

Heretofore developed colors have been unsatisfactory on leather because of the harmful effect of nitrous acid. By means of this invention developed colors have been made available for use with leather.

The azo dyes which are produced by this process have a brighter shade than the dyes made from the same intermediates produced by removing nitrous acid with urea; and have a brighter shade than dyes produced from the same intermediates by any process of the prior art. This process achieves the rapid and complete elimination of nitrous acid from the diazotization bath without harm to the diazo body, and in this respect is a great improvement over urea, which eliminates nitrous acid only partially, and which acts so slowly that simultaneous decomposition of the diazo body occurs. This process permits the diazotization of the intermediates with a large excess of nitrous acid, which is frequently advantageous, permits more rapid diazotization, and reduces the possibility of forming diazo-amino compounds.

The intermediates used in this process are the intermediates used in the prior art, and the process is applicable to all the processes of the prior art. The dyes produced are new in purity and in intensity of color.

I claim:

1. In the process of dyeing leather with a developable azo dye the step of treating the leather with sulfamic acid after the diazotization and prior to the application of the coupling component.

2. The process which comprises diazotizing a primary arylamine, admixing sulfamic acid with the diazotized amine, and coupling the diazotized amine with an azo dyestuff coupling component.

HERBERT A. LUBS.